United States Patent
Dearing et al.

(10) Patent No.: US 6,732,137 B1
(45) Date of Patent: May 4, 2004

(54) PERFORMANCE OPTIMIZATION FOR DATA SHARING ACROSS BATCH SEQUENTIAL PROCESSES AND ON-LINE TRANSACTION PROCESSES

(75) Inventors: Gerard MacLean Dearing, San Jose, CA (US); Kenneth Michael Kapulka, San Jose, CA (US); Jimmy Paul Strickland, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,204

(22) Filed: May 12, 1999

(51) Int. Cl.$^7$ ................................................ G06F 9/00
(52) U.S. Cl. ...................................................... 709/100
(58) Field of Search ......................................... 709/100

(56) References Cited

U.S. PATENT DOCUMENTS

| | | | |
|---|---|---|---|
| 5,109,512 A | * | 4/1992 | Bahr et al. .................. 709/103 |
| 5,115,392 A | * | 5/1992 | Takamoto et al. .......... 709/101 |
| 5,557,792 A | * | 9/1996 | Josten et al. .................... 707/8 |
| 5,668,993 A | | 9/1997 | Peters et al. |

OTHER PUBLICATIONS

Kataoka, A Multiversion Concurrency Control Algorithm for Concurrent Execution of Partial Updatre and Bulk Retrieval Transactions , 1991, JaPan, p. 130–136.*
IBM Technical Disclosure Bullentin, Lock Management Architecture, Oct. 1988, vol. No.: 5, Pager No. 125–128.*
Kataoka, A Multiversion Concurrency Control Algorithm for Concurrent Execution of Partial Update and Bulk Retrieval Transactions, 1991, JaPan, p. 130–136.*
IBM Technical Disclosure Bullentin, Lock Management Architecture, Oct. 1988, vol. No.:5, p. No. 125–128.*

* cited by examiner

*Primary Examiner*—John Follansbee
*Assistant Examiner*—LeChi Truong
(74) *Attorney, Agent, or Firm*—Sawyer Law Group LLP

(57) ABSTRACT

Aspects for data sharing across batch sequential processes and on-line transactional processes in a clustered arrangement of multiple data processing systems are described. In a method aspect, the method includes performing on-line transaction process accesses and batch sequential process accesses on record data. The method further includes utilizing a dual-level locking protocol for the on-line transaction process accesses and batch sequential process accesses to achieve substantially concurrent accessibility to the record data with minimized processing overhead for the batch sequential processes.

11 Claims, 4 Drawing Sheets

PERFORMANCE OPTIMIZATION FOR DATA SHARING ACROSS BATCH SEQUENTIAL PROCESSES AND ON-LINE TRANSACTION PROCESSES

FIELD OF THE INVENTION

The present invention relates to data sharing in a multiple data processing system arrangement, and more particularly to data sharing across batch sequential processes and on-line transaction processes in a clustered data processing system arrangement.

BACKGROUND OF THE INVENTION

In today's information technology industry, customers desire systems that have better performance and cost improvements over their current systems, while permitting continued use of their existing applications. High availability is also important given today's rising mobile workforce and ability for global connectivity through the Internet. Current processing system designs for information technology applications must provide scalable, granular growth, and continuous application availability. Clustering technology, such as IBM Corporation's S/390 Parallel Sysplex, has been developed to achieve these design needs.

A cluster arrangement links individual data processing systems in a manner that creates a single, powerful system, which can support numerous users simultaneously. A cluster offers high availability and excellent scalability. If one system/node in the cluster fails, the other systems in the cluster continue to run. FIG. 1 illustrates a cluster arrangement, e.g., a parallel sysplex system. Multiple systems 10, e.g., System 1 to System N, are included in the sysplex, where each system 10 has one or more computing processors 12 and memory with local caches 14. By way of example, the System/390 Parallel Sysplex from IBM Corporation, Armonk, NY, is an example of a set of S/390 systems connected together by a clustering technology. An instance of the operating system, OS/390, runs on each system of the sysplex. Each of the systems access DASD (direct access storage device) 20 that is shared among the systems. The clustered system support enables large business applications to be spread across the multiple systems with dynamic workload balancing, which yields a wide range of application capacity scaling and extremely high application availability across planned and unplanned outage of individual systems. The load-balancing and availability features of parallel sysplex result in an application running on one system at one point in time and then run on another system at another point in time. To help facilitate the activity, the systems 10 are each coupled to an external time reference component 16 and a coupling facility 18. Connections to DASD subsystems 20 are facilitated through a dynamic switch 22.

Key elements of the S/390 sysplex technology are hardware and software functions/services that support data sharing. The OS/390 VSAM (virtual storage access method) file management system has been extended to exploit this technology in a product capability called VSAM RLS (record level sharing). VSAM RLS is a generally available function that enables multi-system sharing of VSAM files for CICS (customer information control system) applications. An extension of the file management system of VSAM RLS enables application sharing for batch programs concurrent with transaction programs. While the basic functions to read/write share the data with fill integrity and availability are possible to achieve, significant overhead is incurred for the batch application programs. The overhead includes having to link to the central file management server on each record access and having to lock each record within the batch being processed.

While the basic functions do produce sharing capabilities for batch and on-line/transactional processes, unfortunately, the high performance normally associated with a batch sequential process through extensive read-ahead and deferred writing of data within the application memory space is severely degraded.

Accordingly, a need exists for a technique that achieves concurrent access to file data by batch sequential processes and transaction processes that avoids inefficiency and elongated run-times. The present invention addresses such a need.

SUMMARY OF THE INVENTION

The present invention provides for data sharing across batch sequential processes and on-line transactional processes in a clustered arrangement of multiple data processing systems. In a method aspect, the method includes performing on-line transaction process accesses and batch sequential process accesses on record data. The method further includes utilizing a dual-level locking protocol for the on-line transaction process accesses and batch sequential process accesses to achieve substantially concurrent accessibility to the record data with minimized processing overhead for the batch sequential processes.

Through the present invention, a technique of sharing data access for batch sequential processes and on-line transaction processes is achieved that reduces the overhead for the batch sequential processes, while maintaining responsiveness for concurrent sharing with on-line transactions. These and other advantages of the aspects of the present invention will be more fully understood in conjunction with the following detailed description and accompanying drawings.

DETAILED DESCRIPTION

The present invention relates to data sharing across batch sequential processes and on-line transaction processes in a clustered data processing system arrangement. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
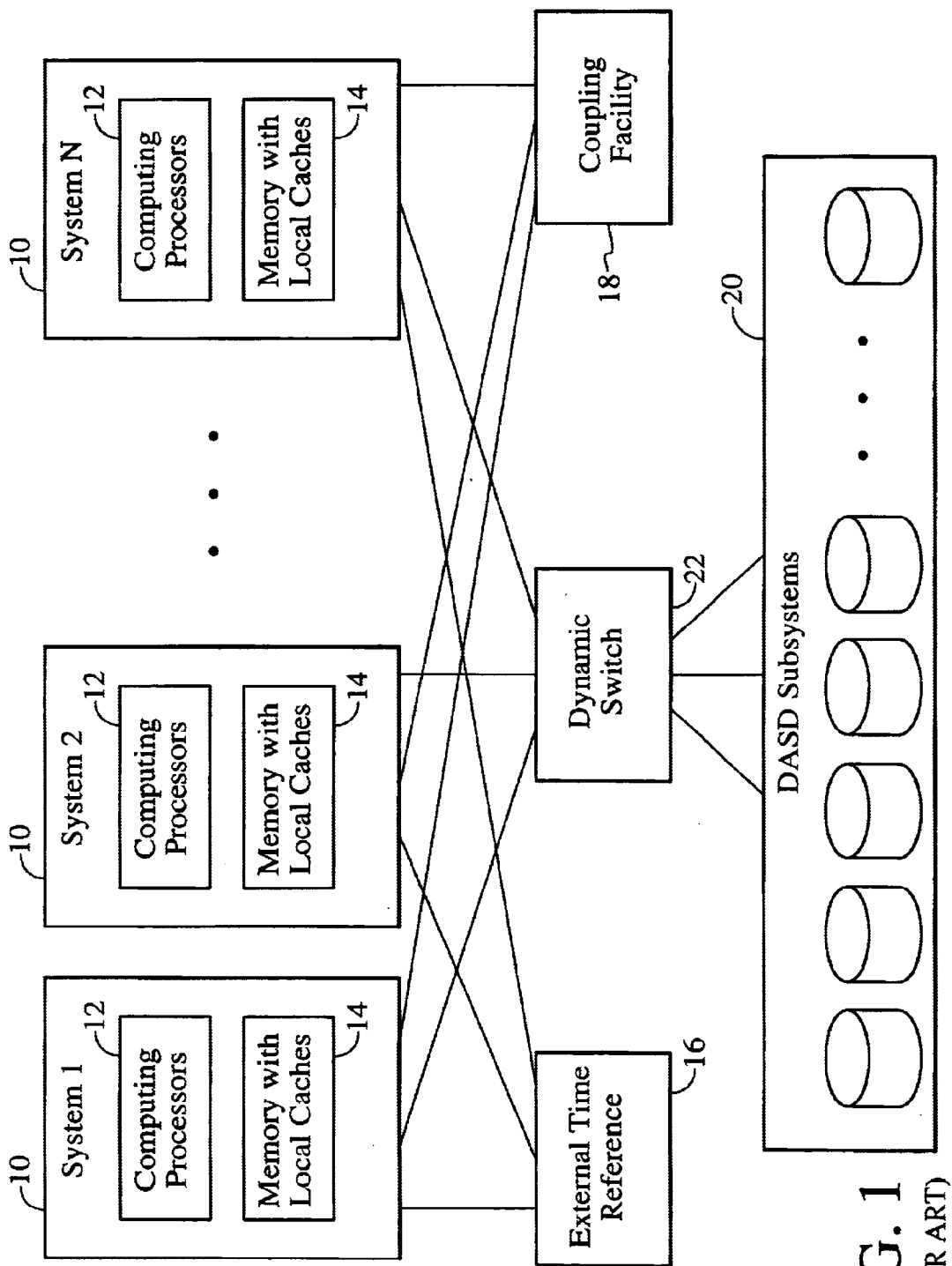
FIG. 1 illustrates a cluster arrangement of multiple data processing systems.

It should be appreciated that the preferred embodiment is discussed with reference to implementation in an example system of a S/390 parallel sysplex with VSAM file management, as described with reference to FIG. 1. This is meant as illustrative of a preferred embodiment, the features of which are applicable in other substantially equivalent clustering type arrangements of multiple systems that desire substantially concurrent operations of transactional processing and batch sequential processing.

The present invention utilizes a dual-level locking hierarchy protocol to achieve efficient and effective concurrent data accesses by transactional processes and batch sequential processes. The present invention supports an environment where the workload dynamically changes. There are 2 types of workloads. One is a transaction workload. The other is a batch sequential processing workload. An assumption is made that the majority of the time there is only a transaction workload. At times, a batch sequential processing workload enters the computing environment and runs concurrently with the existing transaction workload.

Figure 2:
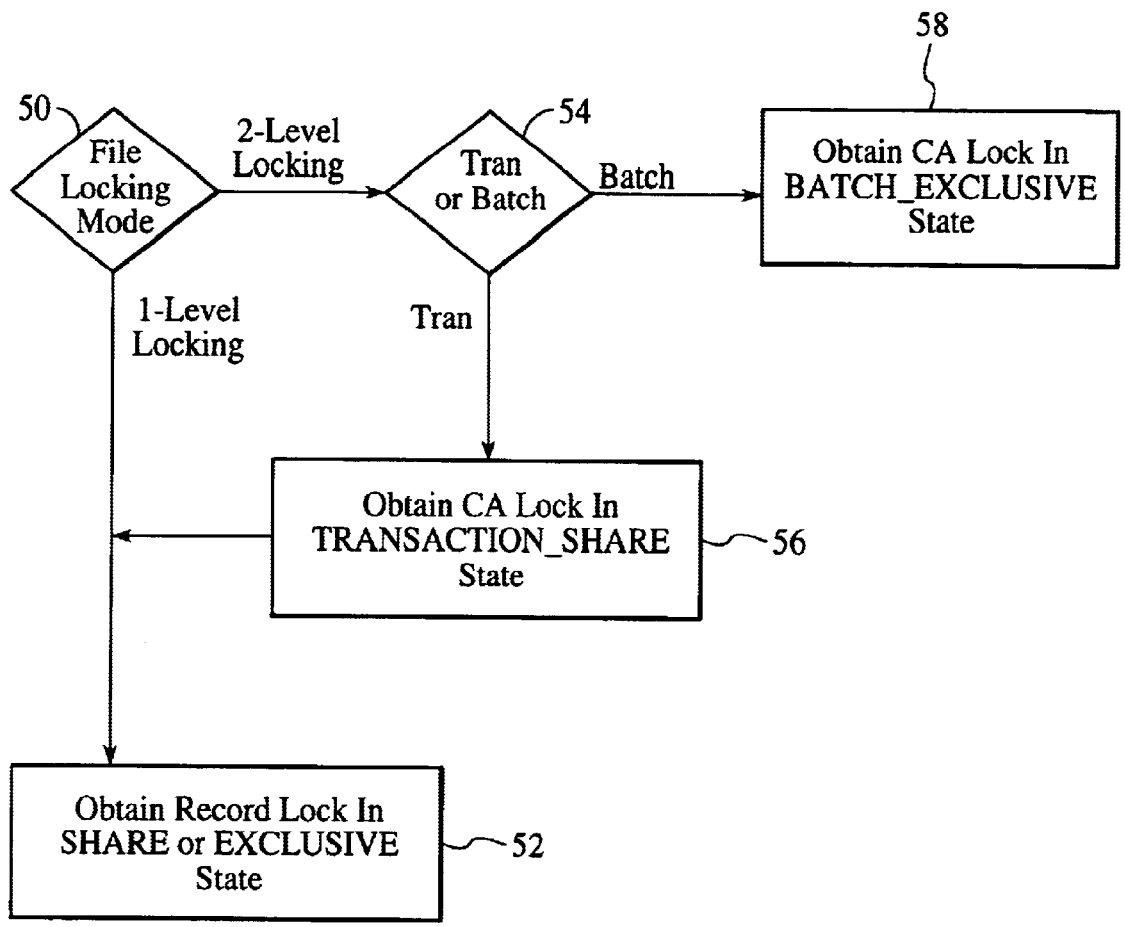
FIG. 2 illustrates a block flow diagram of an overall method for utilizing a duallevel locking hierarchy for transaction processes and batch sequential processes in accordance with the present invention.

FIG. 2 illustrates a block flow diagram of an overall method for utilizing a duallevel locking hierarchy for transaction processes and batch sequential processes in accordance with the present invention. The decision to use a 1-level or 2-level locking protocol is made at a file level granularity. The method initiates with a determination of the file locking mode needed (step 50). When only a transaction process is accessing a file, a first level locking protocol (1-level locking) is utilized. While the file is only accessed by transactions, a typical database manager locking protocol is used as the first level locking protocol. Thus, on read access, a SHARE state lock is obtained on the accessed record, and on write access, an EXCLUSIVE lock is obtained on the accessed record. Once the desired transaction is completed, the locking is released, and any updated information is committed.

When a batch sequential process make its first access to a file as determined in (step 50), the locking protocol used for that file dynamically switches from the first level locking protocol to a second level locking protocol, i.e., a 2-level combined transaction and batch sequential access locking protocol. While the 2-level locking protocol is in use, the lock manager obtains a CA (control area) lock on behalf of transaction (TRAN) requests (as determined to occur via step 54). For purposes of this discussion, a control area refers to a sequentially ordered set of records of a file, thus acting as a partition of a file. The CA lock is obtained in addition to the SHARE or EXCLUSIVE record locks. When obtained for a transaction, the state of the CA lock is TRANSACTION_SHARED (step 56). Transactions always obtain CA locks in TRANSACTION_SHARED state. Thus, multiple transactions share access to a CA. Additional individual record locks obtained by the transactions serialize their access to the records within the CA. The TRANSACTION_SHARED state CA locks do not block access across transactions. These locks block batch sequential processing access to the CA. Thus, before granting a CA lock to a batch sequential process, CA locks must be obtained for transactions that already hold locks on records within the file. The CA locks now held by the transactions inhibit batch sequential access to the records locked by the transactions. When obtained for a batch sequential process, the state of a CA lock is BATCH_EXCLUSIVE (step 58). The BATCH_EXCLUSIVE CA locks serialize access to CAs (sets or groups of sequential records) across multiple batch sequential processes when there is no access to the CA by transactions.

In accordance with the present invention, utilization of the BATCH_EXCLUSIVE lock ensures that while a batch sequential process is holding the control area lock, the batch sequential process may access any/all records within the control area without obtaining record locks and without making calls to the file management server for the records. Thus, the overhead for record accesses is minimized, as is desirable for the batch sequential processes.

Figure 3:
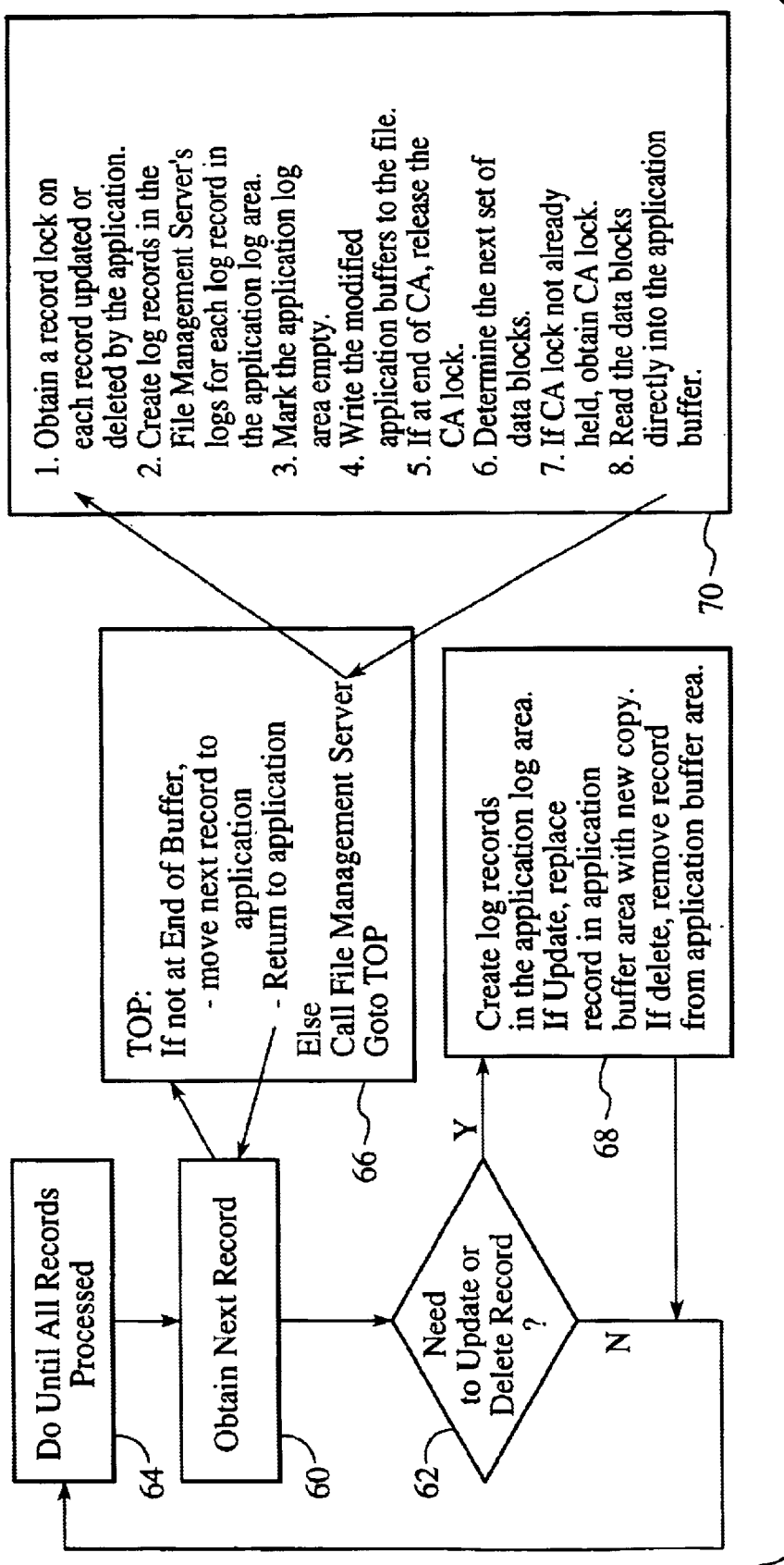
FIG. 3 illustrates a block flow diagram for batch sequential processing in accordance with the present invention.

Referring now to FIG. 3, the diagram of FIG. 3 illustrates a batch sequential processing flow in terms of the application program performing the batch sequential process, file manager logic in the application address space, and the file management server. In terms of the application program, records from the control area are obtained (step 60) and a need for updating or deleting of a current record is determined (step 62) until all records are processed (step 64).

The file manager logic in the application address space moves the next record to the application if the logic is not at the end of application buffer area that holds the data from the control area (step 66) when the application program obtains a next record (step 60). When the application program determines a need for updating or deleting a record, i.e., step 62 is affirmative, the file manager logic creates log records in the application log area (step 68). For the updating of a record, the record is replaced in the application buffer area with a new copy. For the deleting of a record, the record is removed from the application buffer area.

In terms of the file management server, block 70 illustrates the processing during a batch sequential process. The batch sequential process accumulates record changes underneath the CA lock and gives the changed records as a batch to the file management server. Thus, the file management server obtains a record lock, i.e., an EXCLUSIVE lock, on each record updated or deleted by the application program. Log records in the file management server's log are created for each log record in the application log area. The application log area is then marked as empty. Modified application buffers are subsequently written to the file. When at the end of the CA, the BATCH_EXCLUSIVE lock on the CA is released. A next set of data blocks is then identified, a CA lock is obtained if not already held, and the data blocks are read directly into the application buffer area.

Once the batch sequential process completes its access to the file, the locking protocol for that file transitions from the 2-level protocol to the 1-level protocol. This improves the efficiency of transaction access to the file, since the CA level locks are no longer required for the transaction access.

Figure 4:
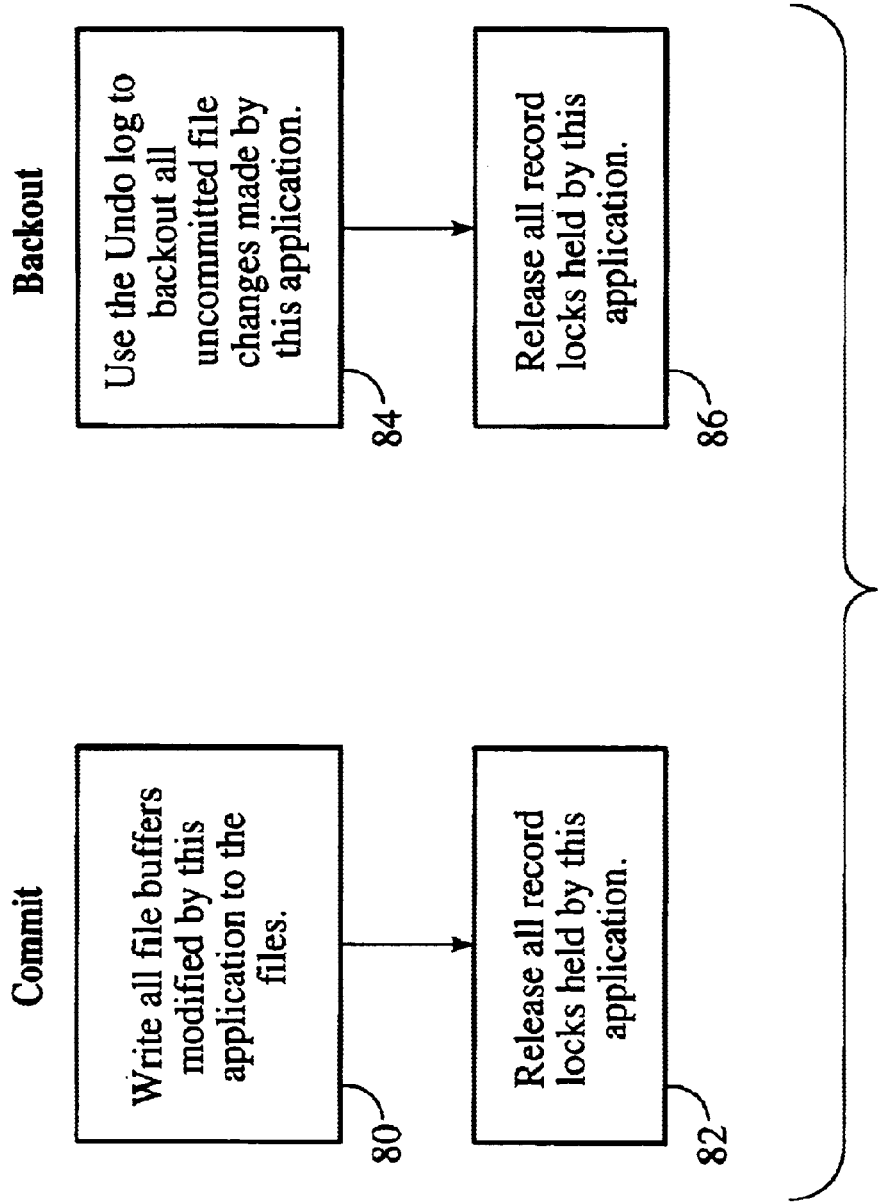
FIG. 4 illustrates a block diagram for file management server commit processing and backout processing.

Referring now to FIG. 4, processing by the file management server during commit or backout is illustrated. During commit, the file management server writes all file buffers modified by the application to the files (step 80). All record locks held by the application are then released (step 82). During backout, an undo log is used to backout all uncommitted file changes made by the application (step 84). Then, all record locks held by the application are released (step 86). For those records not committed or backed-out when a failure occurs, a lock is maintained on those records. High availability of data across failures is maintained, since only changed records where the change could not be committed or backed-out are unavailable to other transactions or batch processes.

Through the present invention, a technique of sharing data access for batch sequential processes and on-line transaction processes is achieved that reduces the overhead for the batch sequential processes, while maintaining responsiveness for concurrent sharing with on-line transactions. Further, the data sharing protocols of the present invention permit sequences of sequential records to be processed within a batch address space between interactions with file management server address space.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for data sharing across batch sequential processes and on-line transactional processes in a clustered arrangement of multiple data processing systems, the method comprising:

performing on-line transaction process accesses and batch sequential process accesses on record data; and utilizing a dual-level locking protocol for the on-line transaction process accesses and batch sequential process accesses to achieve substantially concurrent accessibility to the record data with minimized processing overhead for the batch sequential processes, including utilizing a first level locking protocol for an on-line transaction process accessing a file, determining if a batch sequential process is accessing a file, and transitioning to a second level locking protocol when a batch sequential process is accessing a file.

2. The method of claim 1 wherein utilizing a first level locking protocol further comprises obtaining record locks in a SHARE or EXCLUSIVE state.

3. The method of claim 1 wherein transitioning to a second level locking protocol further comprises obtaining a control area lock in a first state for transaction requests in addition to record locks.

4. The method of claim 3 wherein the first state further comprises a TRANSACTION_SHARED state.

5. The method of claim 4 wherein transitioning to a second level locking protocol further comprises obtaining a control area lock in a second state for the batch sequential process.

6. The method of claim 5 wherein the second state further comprises a BATCH_EXCLUSIVE state.

7. A system for data sharing across batch sequential processes and on-line transactional processes, the system comprising:

a plurality of direct access storage devices (DASDs) for storing record data;

a plurality of data processing systems coupled to the plurality of DASDs in a clustered system arrangement, wherein batch sequential process accesses and on-line transaction process accesses occur substantially concurrently to the record data by the plurality of data processing systems through utilization of a dual-level locking protocol for the on-line transaction process accesses and batch sequential process accesses with minimized overhead for the batch sequential process accesses, including utilizing a first level locking protocol for an on-line transaction process accessing a file, the first level locking protocol including obtaining record locks in a SHARE or EXCLUSIVE state, determining if a batch sequential process is accessing a file, and transitioning to a second level locking on a protocol when a batch sequential process is accessing a file.

8. The system of claim 7 wherein transitioning to a second level locking protocol further comprises obtaining a control area lock in a first state for transaction requests in addition to record locks.

9. The system of claim 8 wherein the first state further comprises a TRANSACTION_SHARED state.

10. The system of claim 9 wherein transitioning to a second level locking protocol further comprises obtaining a control area lock in a second state for the batch sequential process.

11. The system of claim 10 wherein the second state further comprises a BATCH_EXCLUSIVE state.

* * * * *

UNITED STATES PATENT AND TRADEMARK OFFICE
CERTIFICATE OF CORRECTION

PATENT NO. : 6,732,137 B1 Page 1 of 1
DATED : May 4, 2004
INVENTOR(S) : Gerard MacLean Dearing et al.

It is certified that error appears in the above-identified patent and that said Letters Patent is hereby corrected as shown below:

Column 3,
Line 17, delete "duallevel" and replace with -- dual-level --

Column 6
Line 22, delete "on a".

Signed and Sealed this

Twenty-fourth Day of August, 2004

JON W. DUDAS
*Director of the United States Patent and Trademark Office*